Patented Oct. 16, 1928.

1,687,525

UNITED STATES PATENT OFFICE.

EARL GROVER STURDEVANT, OF OAK PARK, ILLINOIS, ASSIGNOR TO WESTERN ELECTRIC COMPANY, INCORPORATED, OF NEW YORK, N. Y., A CORPORATION OF NEW YORK.

FLAMEPROOF ELECTRIC INSULATION AND METHOD OF PRODUCING THE SAME.

No Drawing.   Application filed December 9, 1924.  Serial No. 754,735.

This invention relates to flame-proof electrical insulation and a method of producing the same, and particularly to flame-proof electrical insulation comprising vulcanizable material and a method of producing such insulation.

The object of the invention is to provide an improved flame-proof electrical insulation.

A feature of the invention is the use of chlorinated matter in electrical insulation which comprises vulcanizable material, to flame-proof the insulation.

In one embodiment of the invention, electrical insulation is produced by intimately mixing chlorinated naphthalene and powdered silica with rubber, a vulcanizing agent and an accelerator, and then vulcanizing the rubber.

In this embodiment of the invention the chlorine and naphthalene are brought into contact under conditions which cause them to react to produce compounds thereof. Preferably, the conditions are such that the resulting material consists mainly of tetrachlornaphthalene. The tetrachlornaphthalene is then mixed intimately with rubber, powdered silica, sulphur, and litharge in predetermined proportions, the resulting mixture being sufficiently plastic so that it may be molded into any desired shape or extruded upon an electrical conductor in strand form. After the desired form has been imparted to the mixture or it has been extruded upon an electrical conductor in strand form, it is subjected to heat and pressure to vulcanize the rubber.

In practice, the proportions of the various materials which enter into the insulation are preferably as follows: 20 parts of rubber, 25 parts of chlorinated naphthalene, 2 parts of sulphur, 10 parts of litharge, and 33 parts of silica.

Insulation produced by practicing the improved method is found to be substantially flame-proof as chlorinated naphthalene will not decompose or burn unless it is continuously subjected to an intense heat and the silica functions to conduct the heat away from the point subjected to a flame with sufficient rapidity to materially lower the temperature at that point.

What is claimed is:

1. Electrical insulation comprising substantially twenty parts of rubber, twenty-five parts of chlorinated naphthalene, two parts of a vulcanizing agent, ten parts of a substance for accelerating vulcanization, and thirty-three parts of silica.

2. Electrical insulation comprising substantially 20 parts of rubber, 25 parts of chlorinated naphthalene, 2 parts of sulphur, 10 parts of litharge, and 33 parts of powdered silica.

In witness whereof, I hereunto subscribe my name this 26 day of November A. D., 1924.

EARL GROVER STURDEVANT.